| United States Patent [19] | [11] Patent Number: 4,956,491 |
| Suzuki et al. | [45] Date of Patent: * Sep. 11, 1990 |

[54] ALPHA-ALKYLACRYLAMIDE DERIVATIVES AND THEIR POLYMERS

[75] Inventors: Yuji Suzuki, Osaka; Satoshi Urano, Kyoto; Hirotoshi Umemoto, Kyoto; Ryuzo Mizuguchi, Kyoto; Kei Aoki, Nara; Noriyuki Tsuboniwa, Osaka, all of Japan

[73] Assignee: Nippon Paint Co., Ltd., Osaka, Japan

[ * ] Notice: The portion of the term of this patent subsequent to Apr. 3, 2007 has been disclaimed.

[21] Appl. No.: 42,713

[22] Filed: Apr. 27, 1987

[30] Foreign Application Priority Data

Apr. 25, 1986 [JP] Japan .................................. 61-97760
Apr. 25, 1986 [JP] Japan .................................. 61-97761

[51] Int. Cl.$^5$ ......................................... C07C 103/147
[52] U.S. Cl. .................................. 560/172; 526/304; 564/153
[58] Field of Search .............................. 560/157, 172

[56] References Cited

FOREIGN PATENT DOCUMENTS 0200000 6/1983 European Pat. Off. .

OTHER PUBLICATIONS

Diefenbach, Die Makomolekulave Chemie, 131, pp. 247–257, (1970).
Weygand, "Preparative Organic Chemistry", 4th Ed, pp. 488–497, (1972).

*Primary Examiner*—Michael L. Shippen
*Attorney, Agent, or Firm*—Wegner & Bretschneider

[57] ABSTRACT

A polymer comprising a carbon-carbon backbone chain and at least one N-(substituted oxalyl)carbamoyl group of the formula: —CO—NH—CO—CO—OR' wherein R' is a hydrocarbon group and at least one lower alkyl group attached to said chain, which is useful as a resin component in a coating, adhesive or molding composition.

3 Claims, No Drawings

ALPHA-ALKYLACRYLAMIDE DERIVATIVES AND THEIR POLYMERS

The present invention relates to alpha-alkylacrylamide derivatives and their polymers. More particularly, it relates to highly reactive N-(substituted oxalyl)-alpha-alkylacrylamides and their polymers, and their production and use.

alpha-Alkylacrylamides of the formula:

$$CH_2=CR-CO-NH_2 \quad (I)$$

wherein R is a lower alkyl group (e.g. methyl, ethyl, propyl) are known to be useful as the starting materials for production of various functional derivatives. For instance, they are reacted with oxalyl dihalides to give alpha-alkylacryloyl isocyanates of the formula:

$$CH_2=CR-CO-NCO \quad (A)$$

wherein R is as defined above (Japanese Patent Publication (unexamined) No. 115557/1985), which are highly reactive at the ethylenic unsaturation and also at the isocyanato group.

The present invention provides an N-(substituted oxalyl)-alpha-alkylacrylamide, which can be derived from the alpha-alkylacrylamide (I). It also provides a polymer comprising a carbon-carbon backbone chain and at least one N-(substituted oxalyl)carbamoyl group and at least one lower alkyl group, which is obtainable by the use of said N-(substituted oxalyl)-alpha-alkylacrylamide as the monomer component and useful as a resin component in a coating, adhesive or molding composition.

The N-(substituted oxalyl)-alpha-alkylacrylamide of the invention is representable by the formula:

$$CH_2=CR-CO-NH-CO-CO-OR' \quad (II)$$

wherein R' is a hydrocarbon group and R is as defined above.

With respect to the hydrocarbon group represented by the symbol R', there is no particular limitation on its molecular weight, but it may be usually not more than about 500. Specific examples of the hydrocarbon group are an alkyl group such as lower alkyl (e.g. methyl, ethyl, propyl, butyl), an alkenyl group such as lower alkenyl (e.g. allyl, butenyl), an alkynyl group such as lower alkynyl (e.g. crotyl), a cycloalkyl group such as cyclo(lower)alkyl (e.g. cyclopentyl, cyclohexyl), an aryl group such as phenyl, an aralkyl group such as ar(lower)alkyl (e.g. benzyl, phenethyl), an alkyl group substituted with a group of the formula: —O—R" (in which R" is an unsaturation-containing group) such as lower alkenyloxy(lower)alkyl (e.g. allylmethyl, allylethyl), etc. The term "lower" herein used is intended to mean not more than 8 carbon atoms, preferably not more than 5 carbon atoms. This invention is, however, generally applicable to the case where the hydrocarbon group is any one other than those as specifically disclosed above and, for instance, may represent somewhat a higher alkyl group such as stearyl.

The N-(substituted oxalyl)-alpha-alkylacrylamide (II) can be produced from the corresponding alpha-alkylacrylamide (I) by various procedures, of which typical examples will be explained below.

Procedure 1

The N-(substituted oxalyl)-alpha-alkylacrylamide (II) is obtainable by reacting the corresponding alpha-alkylacrylamide (I) with an oxalyl monohalide monoester of the formula:

$$X-CO-CO-OR' \quad (III)$$

wherein X is a halogen atom (e.g. chlorine, bromine) and R' is as defined above, usually in an inert solvent at a temperature of about 20° to 200° C. The temperature below 20° C. can not afford a sufficient reaction rate, while that over 200° C. may cause the progress of side-reactions.

The molar proportion of the alpha-alkylacrylamide (I) and the oxalyl monohalide monoester (III) to be used for the reaction may be from about 10:1 to 1:10, preferably from about 5:1 to 1:5. The inert solvent may be chosen from aromatic hydrocarbons (e.g. benzene, toluene, xylene), halogenated hydrocarbons (e.g. chloroform, methylene chloride, chlorobenzene, dichlorobenzene), esters (e.g. celosolve acetate, ethyl acetate, butyl acetate), ethers (e.g. diethyl ether, tetrahydrofuran, dioxane), etc.

During the reaction, a hydrogen halide is byproduced, and immediate elimination of the by-produced hydrogen halide from the reaction system is favorable. This is because such elimination is effective in smooth proceeding of the reaction on one hand and in preventing the decrease of the yield of the desired product due to the addition of the hydrogen chloride to the once-produced N-(substituted oxalyl)-alpha-alkylacrylamide (II) on the other hand. In order to attain said elimination of the hydrogen halide, the use of any hydrogen halide-capturing substance in the reaction system or the adoption of any means for acceleration of elimination of the hydrogen halide from the reaction system is recommended. In usual cases, an organic or inorganic base (e.g. triethylamine, dimethylaniline, pyridine, potassium ethoxide, potassium t-butoxide) is used as the hydrogen halide-capturing agent. Instead, large excess of the alpha-alkylacrylamide (I) may be used as the hydrogen halide-capturing agent. The elimination may be also achieved, for instance, by effecting the reaction under the reflux condition and/or by bubbling the reaction mixture with an inert gas (e.g. nitrogen).

Post-treatment may be carried out by a per se conventional procedure, for instance, by extracting the reaction mixture with an appropriate organic solvent and subjecting the extract to column chromatography, recrystallization or distillation under reduced pressure.

Procedure 2

The N-(substituted oxalyl)-alpha-alkylacrylamide (II) is obtainable by reacting the corresponding alpha-alkylacrylamide (I) with an oxalyl dihalide of the formula:

$$X-OC-CO-X \quad (IV)$$

wherein X is as defined above, usually in an inert solvent at a temperature of about 0° to 80° C. and reacting the resulting oxazolinedione hydrohalide of the formula:

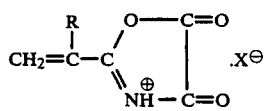   (V)

wherein R and X are each as define above with an alcohol of the formula:

R'—OH   (VI)

wherein R' is as defined above in the presence or absence of an inert solvent at a temperature of about −30° to 40° C.

The reaction between the alpha-alkylacrylamide (I) and the oxalyl dihalide (IV) in the first step is disclosed in European Patent Application No. 86303601.8. Thus, the reaction may be carried out by introducing the oxalyl dihalide (IV) first into a reactor, and the alpha-alkylacrylamide (I) is portionwise added thereto continuously or intermittently. The molar ratio of the alpha-alkylacrylamide (I) and the oxalyl halide (IV) may be usually from about 1:1–3, preferably from about 1:1–1.5. Any reaction medium is not necessarily required to use, but its use is normally preferred for uniform and smooth proceeding of the reaction. Examples of the reaction medium are inert solvents chosen from hydrocarbons, halogenated hydrocarbons, ethers, esters, etc., among which particularly preferred are halogenated hydrocarbons (e.g. carbon tetrachloride, chloroform, dichloromethane, 1,1-dichloroethane, 1,2-dichloropropane, 1,1,1-trichloroethane, 1,1,2-trichloroethane, 1,4-dichlorobutane, chlorobenzene, ethylene tetrachloride, trichloroethylene, chloropropane). The reaction temperature is ordinarily from −50° C. to the decomposition temperature of the oxazolinedione hydrohalide (V), preferably from about 0° to 80° C.

The reaction of the oxazolinedione hydrohalide (V) with the alcohol (VI) in the second step may be effected in the presence or absence of an inert solvent. The molar proportion of the oxazolinedione hydrohalide (V) and the alcohol (VI) to be used for the reaction may be from about 1:1 to 1:20, preferably from about 1:5 to 1:15. Examples of the inert solvent are those as exemplified in connection with Procedure 1. When the inert solvent is not used, the alcohol (VI) may be employed in excess so as to be served not only as the reagent but also as the reaction medium. The reaction is normally effected at a temperature of from about −30° to 40° C., preferably from about −10° to 30° C. When the temperature is less than about −30° C., the reaction does not substantially proceed. When the temperature is more than about 40° C., the oxazolinedione hydrohalide (V) may be decomposed.

During the reaction, a hydrogen halide is by-produced, and immediate elimination of the by-produced hydrogen halide from the reaction system is favorable on the same reason as explained in Procedure 1. For said elimination, the incorporation of a hydrogen halide capturing agent into the reaction system is preferred. As the hydrogen halide-capturing agent, there may be used the one as exemplified in Procedure 1. Usually, the reaction is effected by adding the oxazolinedione hydrohalide (V) to a mixture of the alcohol (VI) and the hydrogen halide-capturing agent optionally with the inert solvent.

Post-treatment may be carried out by a per se conventional procedure, for instance, by eliminating the inert solvent and excess of the alcohol from the reaction mixture, admixing the residue with water and an organic solvent, removing the dehydrohalogenating agent from the extract and subjecting the resultant product to purification such as extraction, column chromatography, recrystallization or distillation under reduced pressure.

Still, the recent NMR study casts a certain doubt on the correctness of the above formula (V) given to the oxazolinedione hydrohalide and rather suggests the following formula:

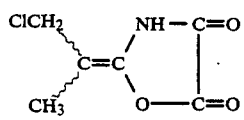   (V')

But, the chemical behavior of the oxazolinedione hydrohalide appears to be coincident with the formula (V) rather than the formula (V'). Accordingly, in this specification, the formula (V) is maintained as such for the oxazolinedione hydrohalide.

Further, the oxazolinedione hydrohalide (V) gives a bis(alpha-alkylacrylamide) compound of the formula:

$$CH_2=CR-CO-NH-CO-CO-NH-CO-CR=CH_2 \quad (VII)$$

wherein R is as defined above when reacted with the alpha-alkylacrylamide (I) in the presence of a base (e.g. sodium hydride), usually in an inert solvent (e.g. diethyl ether, dioxane, tetrahydrofuran, benzene, acetone) at a temperature from 0° to 40° C., preferably around room temperature. This bis(alpha-alkylacrylamide) compound (VII) is itself useful as a monomer component to produce a polymer, because of the presence of two ethylenic unsaturations in the molecule.

Procedure 3

The N-(substituted oxalyl)-alpha-alkylacrylamide (II) is obtainable by reacting the corresponding alpha-alkylacrylamide (I) with an oxalyl diester of the formula:

R'O—CO—CO—OR'   (VIII)

wherein R' is as defined above at a temperature of about 20 to the refluxing temperature of the reaction mixture, preferably around room temperature.

The molar proportion of the alpha-alkylacrylamide (I) and the oxalyl diester (VIII) to be used for the reaction may be from about 10:1 to 1:10, preferably from about 5:1 to 1:5. The use of an inert solvent is not necessarily required; when used, it may be chosen from aromatic hydrocarbons (e.g. benzene, toluene, xylene), halogenated hydrocarbons (e.g. chloroform, methylene chloride, chlorobenzene, dichlorobenzene), esters (e.g. celosolve acetate, ethyl acetate, butyl acetate), ethers (e.g. diethyl ether, tetrahydrofuran, dioxane), etc. When the inert solvent is not used, the oxalyl diester (VIII) may be employed in large excess.

Likewise the reaction between the alpha-alkylacrylamide (I) and the oxalyl monohalide monoester (III), the use of a hydrogen halide-capturing substance, particularly an organic or inorganic base (e.g. triethylamine, dimethylaniline, pyridine, potassium ethoxide, potassium t-butoxide) is highly recommendable.

Depending upon the reaction conditions, the reaction mixture may contain a bis(alpha-alkylacrylamide) compound (VII) in addition to the N-(substituted oxazolyl)-alpha-alkylacrylamide (II).

Post-treatment may be carried out by a per se conventional procedure, for instance, by extracting the reaction mixture with an appropriate organic solvent and subjecting the extract to column chromatography, recrystallization or distillation under reduced pressure.

The thus obtained N-(substituted oxalyl)-alpha-alkylacrylamide (II) has the following chemical structure, which may be divided into three portions as set forth below:

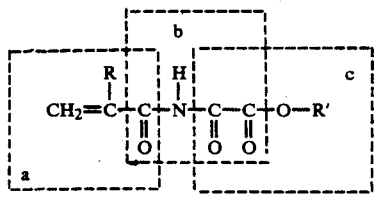

Of these three portions, the portion (a) contains a conjugated double bond structure. Thus, the N-(substituted oxalyl)-alpha-alkylacrylamide (II) can be polymerized by itself or with any other polymerizable monomer to give a polymer, which is useful as a resin component in a coating, adhesive or molding composition or the like. The portion (b) contains a C,N-diacylamide linkage, which contributes in exertion of a high intermolecular cohesive force and a high intermolecular hydrogen bond forming property. Thus, the polymer obtained by polymerizaion of the N-(substituted oxalyl)-alpha-alkylacrylamide (II) optionally with any other polymerizable monomer shows high elasticity, toughness and adhesion. The portion (c) contains a ketoester linkage, and the substituent R' is readily exchangeable with any other substituent. Thus, various monomers being different in polarity, polymerizability, solubility, functionality, reactivity, etc. can be readily produced.

As understood from the above, the N-(substituted oxalyl)-alpha-alkylacrylamide (II) is useful as a monomeric intermediate in the synthesis of various chemical products of low or high molecular weights. A typical example of its practical utilization is the production of a polymer having excellent physical properties suitable as a resin component in coating, adhesive and molding compositions.

The polymer which can be produced by the use of the N-(substituted oxalyl)-alpha-alkylacrylamide (II) comprises a carbon-carbon backbone chain and at least one group of the formula:

wherein R' is as defined above and at least one lower alkyl group bonded to said chain. Such polymer has usually a molecular weight of about 1,000 to 100,000 and contains said group (B) in a content of about 0.1 to 76.0% by weight based on the weight of the polymer.

Said polymer can be produced by polymerization of the N-(substituted oxalyl)-alpha-alkylacrylamide (II) optionally with at least one other polymerizable monomer.

The other polymerizable monomer as the optional component may be chosen from a wide variety of polymerizable compounds, of which examples are as follows: unsaturated acids (e.g. acrylic acid, methacrylic acid, crotonic acid, cinnamic acid, 2-isopropylacrylic acid, cis- or trans-2-decenoic acid, alpha-chloroacrylic acid, beta-trans-nitroacrylic acid), unsaturated alcohols (e.g. croton alcohol, cinnamyl alcohol, o-hydroxystyrene, ethylene glycol monoacrylate, ethylene glycol monomethacrylate, propylene glycol monoacrylate, propylene glycol monomethacrylate), unsaturated amides (e.g. acrylamide, methacrylamide, crotonamide, cinnamylamide, p-benzadmidostyrene), unsaturated sulfonic acids (e.g. 2-sulfoethyl acrylate, 2-sulfoethyl methacrylate, t-butyl acrylamidosulfonic acid, 4-sulfophenyl acrylate, p-vinylbenzenesulfonic acid), unsaturated phosphoric acids (e.g. acid phosphoxyethyl methacrylate, 3-chloro-2-amidophosphoxypropyl methacrylate, acid phosphoxypropyl metharylate, vinyl phosphate, isopropenyl phosphate), unsaturated amines (e.g. allylamine, o-aminostyrene, m-aminostyrene, t-butylaminoethyl methacrylate, 7-amino-3,7-dimethyloctyl acrylate), monoolefinic or diolefinic hydrocarbons (e.g. styrene, alpha-methylstyrene, alphaethylstyrene, isobutylene, 2-methylbutene-1,2-methylpentene-1, 2,3-dimethylbutene-1, 2,3-dimethylpentene-1, 2,4-dimethylpentene-1,2,3,3-trimethylpentene-1,2,3-dimethylhexene-1, 2,4-dimethylhexene-1, 2,5-dimethylhexene-1, 2-methyl-3-ethylpentene-1, 2,3,3-trimethylpentene-1, 2,3,4-trimethylpentene-1, 2-methyloctene-1, 2,6-dimethylheptene-1, 2,6-dimethyloctene-1, 2,3-dimethyldecene-1, 2-methylnonadecene-1, ethylene, propylene, butylene, amylene, hexylene, 1,3-butadiene, isoprene), halogenated monoolefinic or diolefinic hydrocarbons (e.g. alpha-chlorostyrene, alpha-bromostyrene, 2,5-dichlorostyrene, 2,5-dibromostyrene, 3,4-dichlorostyrene, o-, m- or p-fluorostyrene, 2,6-dichlrostyrene, 2,6-difluorostyrene, 3-fluoro-4-chlorostyrene, 3-chloro-4-fluorostyrene, 2,4,5-trichlorostyrene, dichloromonofluorostyrene, 2-chloropropene, 2-chlorobutene, 2-chloropentene, 2-chlorohexene, 2-chloroheptene, 2-bromobutene, 2-bromoheptene, 2-fluorohexene, 2-fluorobutene, 2-iodopropene, 2-iodopentene, 4-bromoheptene, 4-chloroheptene, 4-fluoroheptene, cis- or trans-1,2-dichloroethylene, 1,2-dibromoethylene, 1,2-difluoroethylene, 1,2-diiodoethylene, chloroethylene (vinyl chloride), 1,1-dichloroethylene (vinylidene chloride), bromoethylene, fluoroethylene, iodoethylene, 1,1-dibromoethylene 1,1-difluoroethylene, 1,1-diiodoetylene, 1,1,2-trifluoroethylene, chlorobutadiene), organic or inorganic acid esters (e.g. vinyl acetate, vinyl propionate, vinyl butyrate, vinyl isobutyrate, vinyl valerate, vinyl caproate, vinyl enanthete, vinyl benzoate, vinyl toluate, vinyl p-chlorobenzoate, vinyl o-chlorobenzoate, vinyl p-methoxybenzoate, vinyl p-ethoxybenzoate, methyl methacrylate, ethyl methacrylate, propyl methacrylte, butyl methacrylate, amyl methacrylate, octyl methacrylate, decyl methacrylate, methyl crotonate, ethyl tiglate, methyl acrylate, ethyl acrylate, propyl acrylate, isopropyl acrylate, butyl acrylate, isobutyl acrylate, amyl acrylate, hexyl acrylate, 2-ethylhexyl acrylate, heptyl acrylate, octyl acrylate, 3,5,5-trimethylhexyl acrylate, decyl acrylate, dodecyl acrylate, isopropenyl acetate, isopropenyl propionate, isopropenyl butyrate, isopropenyl isobutyrate, isopropenyl valerate, isopropenyl caproate, isopropenyl enanthete, isopropenyl benzoate, isopropenyl p-chlorobenzoate, isopropenyl o-chlorobenzoate, isopropenyl o-bromobenzoate, isopropenyl m-chlorobenzoate, isopropenyl toluate, isopropenyl alphachloroacetate, isopropenyl alpha-bromopropionate, vinyl alpha-chloroacetate, vinyl alpha-bromoacetate, vinyl alphachloropropionate, vinyl alpha-bromopropionate, vinyl alpha-chlorobutyrate, vinyl alpha-chlorovalerate, vinyl alpha-bromovalerate, allyl chloride, allyl cyanide, allyl bromide, allyl fluoride, allyl iodide, allyl chloride carbonate, allyl nitrate, allyl thiocyanate, allyl formate, allyl acetate, acetate propionate, allyl butyrate, allyl valerate, allyl caproate, allyl 3,5,5-trimethylhexanoate, allyl benzoate, allyl acrylate, ally crotonate, allyl oleate, allyl chloroacetate, allyl trichloroacetate, allyl chloropropionate, allyl chlorovalerate, allyl lactate, allyl pyruvate, allyl aminoacetate, allyl acetoacetate, allyl thioacetate, methallyl chloride, methallyl bromide, methallyl nitrate, methallyl thiocyanate, methallyl acetate, methallyl propionate, methallyl butyrate, methallyl valerate, methallyl benzoate, methallyl chloropropionate, beta-ethylallyl acetate, beta-propylallyl acetate, 4-acetoxy-1-butene, 4-acetoxy- 2-methylbutene, 4-acetoxy-2-(2,2-dimethylpropyl)-1-butene, 4-acetoxy-1-pentene, methyl alpha-chloroacrylate, methyl alpha-bromoacrylate, methyl alpha-fluoroacrylate, methyl alpha-iodoacrylate, ethyl alpha-chloroacrylate, propyl alpha-chloroacrylae, isopropyl alpha-chloroacrylate, isopropyl alpha-bromoacrylate, amyl alpha-chloroacrylate, decyl alpha-chloroacrylate, methyl alpha-cyanoacrylate, ethyl alpha-cyanoacrylate, amyl alpha-cyanoacrylate, decyl alpha-cyanoacrylate, dimethyl maleate, diethyl maleate, diallyl maleate, dimethyl fumarate, diethyl fumarate, dimethacryl fumarate, diethyl glutaconate), organic nitriles (e.g. acrylonitrile, methacrylonitrile, ethacrylonitrile, 3-octenenitrile, crotonitrile, oleonitrile), unsaturated alcohols (e.g. allyl alcohol, ethylene glycol monoacrylate, ethylene glycol monomethacrylate, propylene glycol monoacrylate, crotonalcohol, cinnamyl alcohol, o-hydroxystyrene), unsaturated amides (e.g. acrylamide, methacrylamide, crotonamide, cinnamylamide, p-benzamidostyrene), etc. These other polymerizable monomers may be used alone or in combination.

In any event, the N-(substituted oxalyl)-alpha-alkylacrylamide (II) may be used in an amount of not less than about 0.1% by weight on the basis of the total weight of the monomeric components. When the amount is less than 0.1% by weight, the physical properties characteristic to the N-(substituted oxalyl)-alpha-alkylacrylamide (II) will be hardly imparted to the produced polymer.

The polymerization is normally carried out in an inert solvent in the presence of a polymerization initiator. As the polymerization initiator, there is usually employed a radical initiator such as azobisisobutyronitrile, benzoyl peroxide, cumene hydroperoxide, tetramethyl thiuram disulfide, 2,2-azobis(4-methoxy-2,4-dimethylvaleronitrile), acetylcyclohexylsulfonyl peroxide or 2,2'-azobis(2,4-dimethylvaleronitrile. The amount of the polymerization initiator may be from about 0.1 to 10 % by weight based on the total weight of the monomer components. Examples of the inert solvent are aliphatic hydrocarbons (e.g. pentane, hexane, heptane), aromatic hydrocarbons (e.g. benzene, toluene, xylene), alicyclic hydrocarbons (e.g. cyclohexane, methyl-cyclohexane, decalin), petrolic hydrocarbons (e.g. petroleum ether, petroleum benzene), halogenated hydrocarbons (e.g. carbon tetrachloride, chloroform, 1,2-dichloroethane), ethers (e.g. ethyl ether, isopropyl ether, anisole, dioxane, tetrahydrofuran), ketones (e.g. acetone, methylethylketone, methylisobutylketone, cyclohexanone, acetophenone, isophorone), esters (e.g. ethyl acetate, butyl acetate), acetonitrile, dimethylformamide, dimethylformsulfoxide), etc. These solvents may be used alone or in combination.

The polymerization temperature is ordinarily from about 40° to 200° C., preferably from about 60° to 150° C. When the temperature is higher than about 200° C., side-reactions may take place When the temperature is too low, the reaction rate becomes too small. When desired, any other additive such as a polymerization regulator may be incorporated into the reaction system.

The thus obtained polymer has usually a molecular weight of about 1,000 to 100,000, preferably of about 2,000 to 80,000. Such polymer is per se useful as a resin component, for instance, in coating, adhesive and molding compositions. The polymer is partially representable by either one of the following formulas:

(Homopolymer)

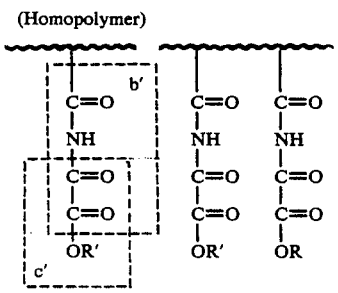

and (Copolymer)

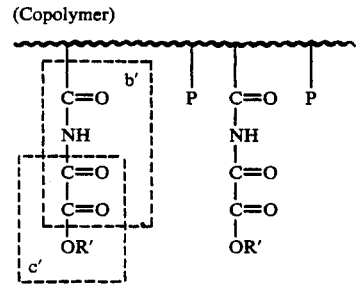

wherein P is a pendant originated from the other polymerizable monomer. As stated above, the portion (b') contains the C,N-diacylamide linkage and has high intermolecular cohesive force and high hydrogen bond forming property. Thus, this portion contributes in imparting high elasticity, toughness, adhesion, dispersibility, diffractivity, etc. to the polymer. The portion (c') contains a ketoester linkage, and the substituent R' is readily exchangeable with any other substituent. Thus, the substituent R' may be appropriately replaced by any other substituent so as to impart polymerization characteristics, polarity, solubility, reactivity, etc. to the polymer. In addition, the use of any proper monomer as the other polymerizalble monomer makes it possible to incorporate a favorable pendant into the polymer so that desired properties can be likewise imparted thereto.

The polymer of this invention is thus useful as a resin component in coating, adhesive and molding compositions.

Practical embodiments of this invention are illustratively shown in the following Examples. The terms Mn and Mw indicate respectively the number average molecular weight and the weight average molecular weight.

EXAMPLE 1

Into a reaction vessel equipped with a stirrer, a cooler, an nitrogen gas introducing inlet and a dropping funnel, benzene (288.5 ml) and methacrylamide (49.1 g; 0.577 mol) were charged, and the resulting mixture was heated with reflux. Refluxing and bubbling with nitrogen gas were continued, during which ethoxalyl chloride (78.5 g; 0.577 mol) was dropwise added thereto in 2.5 hours. After the dropwise addition was completed, refluxing was continued for 5 hours. The benzene was distilled off, hydroquinone (0.01 g) was added thereto, and distillation under reduced pressure was carried out to give N-ethoxalylmethacrylamide (45.8 g). Yield, 43%. B.P., 110°-115° C./0.3 mmHg. Refractive index, 1.473.

IR $v$: 3300 (N—H), 1760 (C=O), 1720 (C=O), 1690 (C=O), 1640 (C=C), 1190 (C—O), 1160 (C—O), 1120 (C—O), 1100 (C—O) cm$^{-1}$.

EXAMPLE 2

Into the same reaction vessel as used in Example 1, ethoxalyl chloride (12.3 g; 0.09 mol) was charged, and the reaction vessel was cooled in an ice bath. A solution of methacrylamide (7.7 g; 0.09 mol) in chloroform (32.4 ml) was dropwise added thereto in 10 minutes. After completion of the addition, a mixture of pyridine (7.2 g; 0.09 mol) and chloroform (10 ml) was added thereto, and the resulting mixture was stirred at room temperature for 1 hour. The reaction mixture was shaken with chloroform (500 ml) and water (500 ml), and the chloroform layer was separated and dried over anhydrous magnesium sulfate, followed by removal of chloroform. Hydroquinone (0.01 g) was added thereto, and distillation under reduced pressure was carried out to give N-ethoxalylmethacrylamide (5.3 g). Yield, 32%.

EXAMPLE 3

Into the same reaction vessel as used in Example 1, ethoxalyl chloride (12.3 g; 0.09 mol) was charged, and the reaction vessel was cooled in an ice bath. A solution of methacrylamide (20.3 g; 0.24 mol) in chloroform (90.0 ml) was dropwise added thereto in 30 minutes, followed by stirring at room temperature for 3 days. The reaction mixture was shaken with chloroform (500 ml) and water (500 ml), and the chloroform layer was separated and dried over anhydrous magnesium sulfate, followed by removal of chloroform. Hydroquinone (0.01 g) was added thereto, and distillation under reduced pressure was carried out to give N-ethoxalylmethacrylamide (4.8 g). Yield, 29%.

EXAMPLE 4

Into the same reaction vessel as used in Example 1, toluene (20 ml) and methacrylamide (2.1 g; 0.025 mol) were charged, and the resulting mixture was heated at 90° C. After the dropwise addition of benzyloxalyl chloride (5.0 g) in 10 minutes, the resultant mixture was vigorously bubbled with nitrogen gas, followed by stirring at 90° C. for 4 hours. The reaction mixture was shaken with chloroform (300 ml) and water (1000 ml), and the organic layer was separated and dried over anhydrous magnesium sulfate, followed by removal of toluene and chloroform under reduced pressure. The resulting product was purified by silica gel column chromatography to give N-benzyloxalylmethacrylamide (2.9 g) as colorless, transparent viscous liquid. Yield, 47%. Refractive index: 1.534.

IR $v$: 3350 (N—H), 1750 (C=O), 1730 (C=O), 1690 (C=O), 1630 (C=C), 1500 (N—H, deformation), 695 (C—H, deformation) cm$^{-1}$.

EXAMPLE 5

In the same reaction vessel as used in Example 1, ethanol (230.4 g; 5.0 mol) and pyridine (39.6 g; 0.5 mol) were charged, and the reaction vessel was cooled at 0° C. in an ice bath. 2-Isopropenyloxazoline-4,5-dione hydrochloride (87.8 g; 0.5 mol) was added thereto in 30 minutes under stirring while keeping the reaction temperature at 0° to 10° C. After completion of the addition, excess ethanol was removed under reduced pressure. The reaction mixture was shaken with ethyl acetate (1,000 ml) and a large amount of water, and the ethyl acetate layer was separated and dried over anhydrous magnesium sulfate, followed by removal of ethyl acetate. Hydroquinone (0.01 g) was added thereto, and distillation under reduced pressure was carried out to give N-ethoxalylmethacrylamide (30.5 g). Yield, 33%.

EXAMPLE 6

Into the same reaction vessel as used in Example 1, benzyl alcohol (27.0 g; 0.25 mol) and pyridine (4.0 g; 0.05 mol) were charged, and the reaction vessel was cooled at 0° C. in an ice bath. 2-Isopropenyloxazoline-4,5-dione hydrochloride (8.8 g; 0.05 mol) was added thereto in 30 minutes under stirring, during which the temperature was kept at 0° to 10° C. After completion of the addition, excess benzyl alcohol was removed by distillation under reduced pressure. The reaction mixture was shaken with chloroform (300 ml) and water (1000 ml), and the chloroform layer was separated and dried over anhydrous magnesium sulfate, followed by removal of chloroform. The residue was purified by silica gel column chromatography to give N-benzyloxalylmethacrylamide (3.9 g) as colorless, transparent, viscous liquid. Yield, 32%.

EXAMPLE 7

Into the reaction vessel as used in Example 1, phenol (23.5 g; 0.25 ml), pyridine (4.0 g; 0.05 mol) and ethyl acetate (25.0 g) were charged, and the reaction vessel was cooled at 10° C. in a water bath. 2-Isopropenyloxazoline-4,5-dione hydrochloride (8.8 g; 0.05 mol) was added thereto in 30 minutes under stirring, during which the temperature was kept at 10° to 20° C. After completion of the addition, ethyl acetate and phenol were removed by distillation under reduced pressure. The reaction mixture was shaken with benzene (300 ml) and water (1000 ml), and the benzene layer was separated and dried over anhydrous magnesium sulfate, followed by removal of benzene. The residue was purified by silica gel column chromatography to give N-phenyloxalylmethacrylamide (2.5 g) as white powder. Yield, 21%. M.P., 83°-85° C.

IR $v$: 3250 (N—H), 3180 (C—H), 1785 (C=O), 1725 (C=O), 1690 (C=O), 1650 (C=C), 1480 (C—H, deformation), 690 (C—H, deformation) cm$^{-1}$.

EXAMPLE 8

Into the same reaction vessel as used in Example 1, 2-hydroxyethyl methacrylate (32.5 g; 0.25 mol), pyridine (4.0 g; 0.05 mol) and chloroform (30.0 g) were charged, and the reaction vessel was cooled at 10° C. in a water bath. 2-Isopropenyloxazoline-4,5-dione hydrochloride (8.8 g; 0.05 mol) was added thereto in 30 minutes under stirring, during which the temperature was kept at 10° to 20° C. After completion of the addition, the resultant mixture was stirred at room temperature for 2 hours. The reaction mixture was shaken with chloroform (500 ml) and water (1000 ml) five times, and the chloroform layer was separated and dried over anhydrous magnesium sulfate, followed by removal of chloroform. The residue was purified by silica gel column chromatography to give N-[(2-methacryloyloxyethyl)oxalyl]methacrylamide (3.4 g) as a colorless, transparent liquid. Yield, 25%. Refractive index, 1.490.

IR ν: 3370 (N—H), 1770 (C=O), 1760 (C=O), 1730 (C=O), 1700 (C=O), 1640 (C=C), 1500 (C—H, deformation), 1160 (C—O, deformation) cm$^{-1}$.

EXAMPLE 9

Into the sam reaction vessel as used in Example 1, stearyl alcohol (13.5 g; 0.05 mol), pyridine (4.0 g; 0.05 mol) and ethyl acetate (130.0 g) were charged, and the reaction vessel was kept at 20° C. in a water bath. 2-Isopropenyloxazoline-4,5-dione hydrochloride (8.8 g; 0.05 mol) was added thereto in 30 minutes under stirring, during which the reaction temperature was kept at 20° to 30° C. After completion of the addition, the reaction mixture was shaken with chloroform (300 ml) and water (1000 ml), and the chloroform layer was separated and dried over anhydrous magnesium sulfate, followed by removal of chloroform. The residue was purified by silica gel column chromatography to give N-stearyloxalylmethacrylamide (0.8 g) as a white solid. Yield, 4 %. M.P., 67°-70° C.

IR ν: 3300 (N—H), 2950 (C—H), 1820 (C=O), 1765 (C=O), 1720 (C=O), 1470 (C—H, deformation), 1170 (C—O, deformation) cm$^{-1}$.

EXAMPLE 10

Into the same reaction vessel as used in Example 1, methanol (160 g; 5 mol) and pyridine (39.6 g; 0.5 mol) were charged, and the reaction vessel was cooled at 0° C. in an ice bath. 2-Isopropenyloxazoline-4,5-dione hydrochloride (87.8 g; 0.5 mol) was dropwise added thereto in 30 minutes under stirring, during which the temperature was kept at 0° to 10° C. After completion of the addition, excess methanol was removed by distillation under reduced pressure. The reaction mixture was shaken with ethyl acetate (300 ml) and water (1000 ml), and the organic layer was separated and dried over anhydrous magnesium sulfate, followed by removal of ethyl acetate. The residue was purified by silica gel column chromatography to give N-methoxalylmethacrylamide (16.1 g) as white crystals. Yield, 19%. M.P., 48.0°-49.5° C.

IR ν: 3300 (N—H), 1760 (C=O), 1740 (C=O), 1695 (C=O), 1640 (C=C), 1500 (N—H, deformation) cm$^{-1}$.

EXAMPLE 11

In the same manner as in Example 10, there was produced N-n-butoxalyl methacrylamide (1.3 g) as a colorless liquid using n-butanol (148.2 g; 2 mol), pyridine (15.8 g; 0.2 mol) and 2-isopropenyloxazoline-4,5-dione hydrochloride (35.1 g; 0.2 mol). Yield, 3%. Refractive index, 1.4693.

IR ν: 3300 (N—H), 1760 (C=O), 1730 (C=O), 1695 (C=O), 1635 (C=C), 1500 (N—H, deformation) cm$^{-1}$.

EXAMPLE 12

In the same manner as in Example 10, there was produced N-allyloxalyl methacrylamide (4.6 g) as a colorless liquid using allyl alcohol (87.1 g; 1.5 mol), pyridine (11.9 g; 0.15 mol) and 2-isopropenyloxazoline-4,5-dione hydrochloride (26.3 g; 0.15 mol). Yield, 16%. Refractive index, 1.4931.

IR ν: 3300 (N—H), 1760 (C=O), 1730 (C=O), 1695 (C=O), 1650 (C=C), 1635 (C=C), 1500 (N—H, deformation) cm$^{-1}$.

EXAMPLE 13

In the same manner as in Example 10, there was produced N-propargyloxalyl methacrylamide (4.0 g) as white needle-like crystals using propargyl alcohol (84.1 g; 1.5 mol), pyridine (11.9 g; 0.15 mol) and 2-isopropenyl-oxazoline-4,5-dione hydrochloride (26.3 g; 0.15 mol). Yield, 14%. M.P., 36.5°-38.0° C.

IR ν: 3450 (C=CH), 3300 (N—H), 2150 (C=C), 1770 (C=O), 1740 (C=O), 1695 (C=O), 1640 (C=O), 1500 (N—H, deformation) cm$^{-1}$.

EXAMPLE 14

Into the same reaction vessel as used in Example 1, 2-propanol (18 g; 0.3 mol) and dioxane (200 ml) were charged, and the reaction vessel was heated to 75° C. in an oil bath. Metallic sodium (3.4 g; 0.15 mol) was portionwise added thereto under stirring. After confirming the consumption of metallic sodium, the reaction system was cooled to 10° C. in a water bath. 2-Isopropenyloxazoline-4,5-dione hydrochloride (26.3 g; 0.15 mol) was added thereto in 30 minutes under stirring, during which the temperature was kept at 0° to 10° C. After completion of the addition, the reaction mixture was shaken with ethyl acetate (300 ml) and water (1000 ml), and the organic layer was separated and dried over anhydrous magnesium sulfate, followed by removal of ethyl acetate. The residue was purified by silica gel column chromatography to give N-isopropoxalyl methacrylamide (1.5 g) as a colorless, transparent liquid. Yield, 5%. Refractive index, 1.4674.

IR ν: 3300 (N—H), 1760 (C=O), 1740 (C=O), 1695 (C=O), 1640 (C=C), 1500 (N—H, deformation) cm$^{-1}$.

EXAMPLE 15

Into the same reaction vessel as used in Example 1, tetrahydrofuran (100 ml) and potassium t-butoxide (11.2 g; 0.1 mol) were charged at room temperature. To the mixture, methacrylamide (8.5 g; 0.1 mol) was added at room temperature, followed by dropwise addition of diethyl oxalate (14.6 g; 0.1 mol). The reaction mixture turned to white paste with slight generation of heat. The mixture was stirred at room temperature for 3 hours, followed by addition of ether (100 ml) and acetic acid (6.0 g; 0.1 mol). The precipitate was filtered, and water (200 ml) was added thereto. The separated organic layer was concentrated under reduced pressure to give N,N'-bis(1-oxo-2-butenyl)ethanediamide (5.4 g). Yield, 48.3%. M.P., 159°-160° C.

IR ν: 3250 (N—H), 1720 (C=O), 1690 (C=O), 1670 (C=O), 1625 (C=C) cm$^{-1}$.

EXAMPLE 16

Sodium hydride (2.0 g; 60% in oil; 50 mmol) was washed with diethyl ether and suspended in diethyl ether (20 ml). To the resultant suspension, methacrylamide (4.35 g; 50 mmol) was portionwise added at room temperature, followed by stirring for 30 minutes. 2-Isopropenyloxazoline-4,5-dione hydrochloride (8.75 g; 50 mmol) was added thereto, and the resulting mixture was stirred for 1 hour and then carefully poured into water. The precipitate was collected by filtration and washed with acetone to give N,N'-bis(1-oxo-2-butenyl)ethanediamide (50 mg). Yield, 0.4%.

EXAMPLE 17

Into the same reaction vessel as used in Example 1, tetrahydrofuran (50 ml), methacrylamide (4.26 g; 50 mmol) and ethoxalyl chloride (6.83 g; 50 mmol) were charged, and refluxing was continued for 4 hours. Removal of the organic solvent by distillation under reduced pressure gave N-ethoxalylmethacrylamide (6.5 g). Yield, 70.6%.

EXAMPLE 18

To a mixture of cellosolve acetate (15.0 g) and butyl acetate (25.0 g) kept at 100° C., a mixture of N-ethoxalylmethacrylamide (8.8 g), methyl methacrylate (8.8 g), styrene (12.4 g), 2-hydroxyethyl methacrylate (11.8 g), n-butyl acrylate (8.2 g) and azobisisobutyronitrile (1.0 g) was dropwise added in 2 hours. After completion of the addition, a mixture of azobisisobutyronitrile (0.5 g) and cellosolve acetate (10.0 g) was further added thereto in 30 minutes, followed by aging for 3 hours to give a pale yellow polymer. Non-volatile content, 50%. Molecular weight, 7,700 (determined by gel permeation chromatography (GPC)).

EXAMPLE 19

To a mixture of cellosolve acetate (15.0 g) and butyl acetate (25.0 g) kept at 100° C., a mixture of N-ethoxalylmethacrylamide (8.8 g), methyl methacrylate (8.8 g), styrene (6.9 g), methacrylic acid (11.8 g), n-butyl acrylate (13.7 g) and azobisisobutyronitrile (1.0 g) was dropwise added in 2 hours. After completion of the addition, a mixture of azobisisobutyronitrile (0.5 g) and cellosolve acetate (10.0 g) was further added thereto in 30 minutes, followed by aging for 3 hours to give a pale yellow polymer. Non-volatile content, 50%. Molecular weight, 3,900 (determined by GPC).

EXAMPLE 20

To a mixture of cellosolve acetate (5.0 g) and butyl acetate (3.8 g) kept at 100° C., a mixture of N-ethoxalylmethacrylamide (7.5 g), cellosolve acetate (7.5 g) and azobisisobutyronitrile (0.15 g) was dropwise added in 2 hours. After completion of the addition, a mixture of azobisisobutyronitrile (0.07 g) and cellosolve acetate (6.2 g) was further added thereto in 30 minutes, followed by aging for 3 hours to give a yellow transparent polymer. Non-volatile content, 19%. Molecular weight, 3,500 (determined by GPC).

EXAMPLES 21 to 29

To a mixture of dioxane (1.63 g) and butyl acetate (0.70 g) kept at 100° C., the N-(substituted oxalyl)-alpha-alkylacrylamide (II) (1.00 g) and azobisisobutyronitrile (0.01 g) were added, and the resultant mixture was stirred at the same temperature for 3 hours. The thus produced polymers and their physical properties are shown in Table 1.

EXAMPLES 30 to 38

To a mixture of dioxane (1.63 g) and butyl acetate (0.70 g) kept at 100° C., the N-(substituted oxalyl)-alpha-alkylacrylamide (II) (0.33 g), styrene (0.33 g), methyl methacrylate (0.33 g) and azobisisobutyronitrile (0.01 g) were added, and the resultant mixture was stirred at the same temperature for 3 hours. The thus produced polymers and their physical properties are shown in Table 1.

TABLE 1

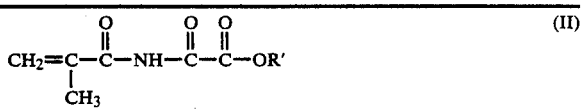

$$CH_2=C-C-NH-C-C-OR' \quad (II)$$
with structure showing CH$_3$ on the α-carbon and two C=O groups.

| | Example No. | N-(Substituted oxalyl)-alpha-alkylacrylamide (II: R=CH$_3$) (R') | Non-volatile content (%) | Molecular weight (Mn) | Mw/Mn |
|---|---|---|---|---|---|
| Homopolymer | 21 | —CH$_3$ | 20.0 | 3,540 | 3.26 |
| | 22 | —(CH$_2$)$_3$CH$_3$ | 16.8 | 3,970 | 13.13 |
| | 23 | —CH$_2$CH=CH$_2$ | 22.4 | 4,930 | 4.20 |
| | 24 | —CH$_2$C≡CH | 20.1 | 6,350 | 2.80 |
| | 25 | —CH(CH$_3$)$_2$ | 16.9 | 2,550 | 1.97 |
| | 26 | —CH$_2$(CH$_2$)$_{16}$CH$_3$ | 17.4 | 4,630 | 4.22 |
| | 27 | —CH$_2$—C$_6$H$_5$ | 23.8 | 5,320 | 3.80 |
| | 28 | —C$_6$H$_5$ | 19.8 | 2,670 | 2.95 |
| | 29 | —CH$_2$CH$_2$OC(=O)C(CH$_3$)=CH$_2$ | (gellation occurred) | | |

TABLE 1-continued $$CH_2=C(CH_3)-\overset{O}{\underset{\|}{C}}-NH-\overset{O}{\underset{\|}{C}}-\overset{O}{\underset{\|}{C}}-OR' \quad (II)$$

| | Example No. | N-(Substituted oxalyl)-alpha-alkylacrylamide (II: R=CH₃) (R') | Non-volatile content (%) | Molecular weight (Mn) | Mw/Mn |
|---|---|---|---|---|---|
| Copolymer | 30 | —CH₃ | 18.4 | 5,790 | 2.85 |
| | 31 | —(CH₂)₃CH₃ | 18.0 | 6,190 | 2.54 |
| | 32 | —CH₂CH=CH₂ | 15.3 | 8,370 | 2.92 |
| | 33 | —CH₂C≡CH | 15.1 | 7,560 | 2.91 |
| | 34 | —CH(CH₃)₂ (isopropyl) | 19.9 | 9,790 | 2.45 |
| | 35 | —CH₂(CH₂)₁₆CH₃ | 21.7 | 8,950 | 2.55 |
| | 36 | —CH₂—C₆H₅ | 23.2 | 9,630 | 2.87 |
| | 37 | —C₆H₅ | 19.7 | 8,230 | 2.25 |
| | 38 | —CH₂CH₂OC(=O)—C(CH₃)=CH₂ | (gellation occurred) | | |

EXAMPLE 39

By the aid of a bar coater, each of the resin compositions comprising the polymers as obtained in Examples 20, 23, 24, 27 and 28 was coated on a tin plate, followed by heating at 100° C. for 3 hours to give a coating film having a thickness of 20 microns. The coating film was subjected to test for pencil hardness (maximum hardness producing no peeling), of which the results are shown in Table 2.

TABLE 2

| R' | Example No. | Pencile hardness |
|---|---|---|
| —CH₂—C₆H₅ | 27 | 2H |
| —C₆H₅ | 28 | 3H |
| —CH₂C≡CH | 24 | 2H |
| —C₂H₅ | 20 | 2H |
| —CH₂CH=CH₂ | 23 | 2H |

EXAMPLE 40

To a Gamborg medium (modified by incorporation of sucrose (5% by weight), 2,4-D ($10^{-6}$M) and benzyladenine ($10^{-8}$M), N-ethoxyalylacrylamide of N-ethoxyalylmehtacrylamide was added to make a concentration of 10 or 100 ppm. Using this medium (100 ml), cells of Euphorbia millii was cultivated under the following conditions for 10 days: Temperature, 26° C.; shaking, 120 rpm; illuminance, 6,000 lux. In comparison with the control, the growth of the cells was suppressed significantly in the medium containing N-ethoxalylacrylamide and not so significantly in the medium containing N-ethoxalylmethacrylamide.

What is claimed is:

1. An N-(substituted oxalyl)-alpha-alkylacrylamide of the formula: CH₂=CR—CO—NH—CO—CO—OR', wherein R is a lower alkyl group and R' has a molecular weight of not more than 500 and is selected from the group consisting of an alkenyl group, an alkynyl group, an aryl group, an aralkyl group and an alkyl group substituted with alkenyloxy.

2. A process for preparing a N-(substituted oxalyl)-alpha-alkylacrylamide of the formula: CH₂=CR—CO—NH—CO—CO—R', wherein R is a lower alkyl group and R' is selected from the group consisting of an alkyl group, an alkenyl group, an alkynyl group, a cycloalkyl group, an aryl group, an aralkyl group, and an alkyl group substituted with a group of the formula OR', wherein R'' is an unsaturation-containing group, which comprises reacting an alpha-alkylacrylamide with an oxalyl dihalide of the formula: X—CO—CO—X, wherein X is a halogen atom, in an inert solvent and reacting the resulting oxazolinedione hydrohalide of the formula:

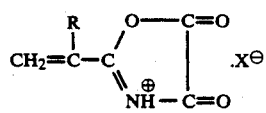
(V)
wherein R is as defined above and X is as defined above,
with an alcohol of the formula: R'—OH, wherein R' is as defined above.
3. The process according to claim 2, wherein the reaction in the second step is carried out in the presence of a hydrogen halide-capturing substance.
* * * * *